Sept. 16, 1941.    H. H. CARPENTER    2,255,759
ELECTRIC HEATING APPLIANCE
Filed April 24, 1940
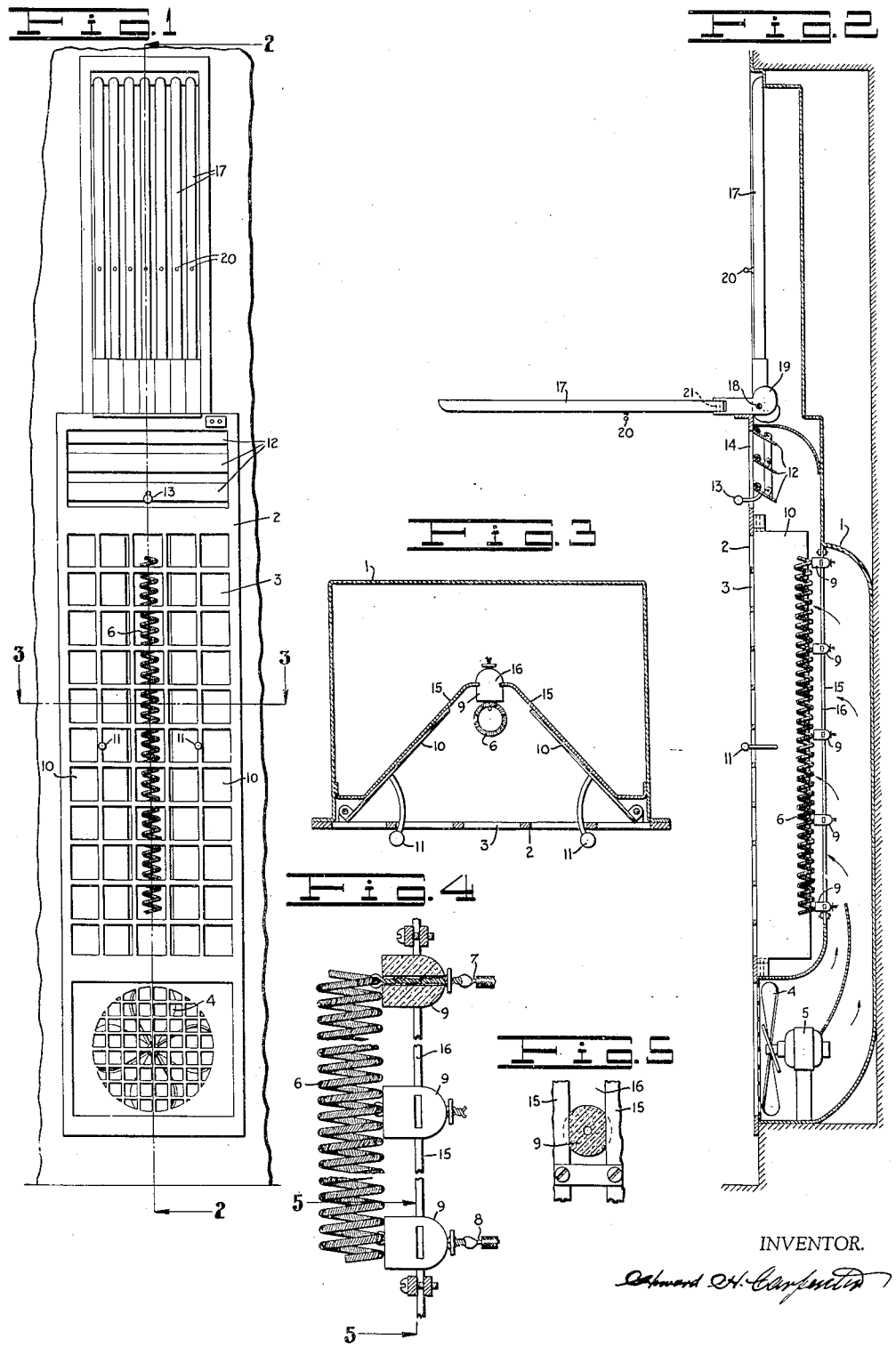
INVENTOR.
Howard H. Carpenter Patented Sept. 16, 1941

2,255,759

UNITED STATES PATENT OFFICE 2,255,759

ELECTRIC HEATING APPLIANCE

Howard H. Carpenter, South Pasadena, Calif.

Application April 24, 1940, Serial No. 331,370

3 Claims. (Cl. 219—39)

This invention relates to electric air heating appliances and is designed to increase their efficiency and usefulness as air heaters and dryers.

The principal object of my invention is to produce improvements in an article of this kind which operate both as an efficient electric heater and as an efficient drying unit as set forth in the following description:

Fig. 1 is a front elevation of the device.

Fig. 2 is a cross section view taken on the line 1—1 of Fig. 1.

Fig. 3 is a cross section view taken on the line 3—3 of Fig. 1.

Fig. 4 is a detail of the insulators supporting the heating element.

Fig. 5 is a further detail of the insulators.

Referring in detail to the various figures, number 1 denotes a casing which is substantially rectangular in cross section and is adapted to enclose the unit and to be attached to or recessed in a wall surface. A grill member 2 encloses the front of the casing. A plurality of openings in the grill member permits the circulation of air through the grill one of which is shown at 3. The fan member 4 driven by the motor 5 draws air in through the lower portion of the grill and discharges it outward around converging partition members 15 and through the openings 16. The air is then heated as it passes over and through coiled heating elements 6 which are disposed in advance of the opening 16. The air stream now heated flows outward through the perforations of the grill member 2 and is available for space heating and drying purposes. By operating the fan the action is that of a circulating heater in which a relatively large volume of air is heated to a comparatively low temperature.

This heater is so arranged that if a smaller volume of air heated to a higher temperature is desired the fan is not operated and the heater operates as a radiant type. In this case a small volume of highly heated air radiates from the heating element and circulates up and out through the grill member. Thus the various needs of both heating and drying are both provided for. It is particularly applicable to bath rooms or other similar or useful applications.

The heating element 6 is supplied with electric current for operation through terminals 7 and 8 and is supported by electrical insulators 9 which are slotted to receive the inner edges of the partitions 15 (see Fig. 5).

The front grill member may be closed to outgoing air by closing vertical dampers 10, operative by arms 11. By closing these dampers the air stream is diverted upward and outward through a reduced opening 14. Deflection of the air current and the regulation of the size of the opening 14 is controlled by a damper 12 operated by an arm 13.

In order to provide a drying rack I have shown a multiple of movable arms 17. These arms are pivoted for vertical movement at 18 and for horizontal adjustment at 21. They are shown in an operative position when horizontal and may be folded back in a vertical position when not in use. A counterweight 19 serves to hold the arms in a vertical position and the knob 20 serves as a hand hold to lower them to an operative position.

In operation the motor driven fan member creates a low air pressure which circulates through and becomes heated by the electric heating element 6. This arrangement not only quickly heats the air stream but the strong air currents which would be unpleasant to a person drying in front of the heater are broken up. On this account I find it preferable to place the heating element in the discharge from the compression member rather than in the suction passage.

If the heater is to be used as a hair or hand dryer the dampers 10 are preferably closed. This diverts the heated air up and out through the higher restricted opening 14 and at an increased velocity desirable for this use. This opening is designed to be placed at a convenient height to cause the outgoing air current to strike the hair of an average person. For simplicity this particular opening is shown as square in shape but may be round or any other shape to suit particular needs. The damper 12 is used to deflect the outgoing stream of air to suit the needs of persons of varying heights. At the same time the damper also controls the temperature of the outgoing air stream. As the air stream moves move slowly over the heating coils it will reach a correspondingly higher temperature. This arrangement thus controls the direction as well as the temperature and velocity of the outgoing air stream.

If it is desired to dry delicate fabrics such as silks, rayons, lingerie, etc. or any other articles they may be suspended from the drying rack members 17. Any form of rack may be used but preferably one that folds back out of the way when not in use. Either the upper or lower or both sets of dampers may be adjusted and used as needed for the particular articles to be dried, a flexibility to varying drying needs being an objective of the design. For simplicity one heating coil is shown but it is obvious that any number of coils may be used and be effective in the suction intake of the compression member as well as the discharge side of the compressor member as herein shown.

If desired the heater as shown may be used as a radiant heater sometimes desired by the operator. In this case the fan member is stopped and reliance for the air circulation is placed entirely on the natural circulation caused by the rise of the heated air currents. This results in a smaller volume of air output but much hotter air than by fan circulation at times desirable.

While these particular forms and arrangements of parts are shown for simplicity it is obvious that other forms and arrangements of the various parts may be used to attain the objectives without departing from the spirit and intent of this invention.

Having thus described my invention I claim:

1. In an air heating appliance, an elongated substantially rectangular casing, said casing including a back and sides, a plane grill member for the front of the casing, partition members in said casing, said partition members being planar throughout the major portion of their area and converging towards the center of the casing, said partition members having their front edge portions secured to the casing and having their rear end edge portions directed toward each other and spaced apart to form a slot, said partition members and said grill forming a chamber, a heating element disposed in said chamber in advance of said slot and in the rear of said grill, insulating members on said heating element, said insulating members being slotted to receive the inner edges of the partition members, a fan in the lower portion of said casing and adapted to draw air into the casing, means to direct a column of air from the fan through the partition members so that it impinges on the heating element, and damper means movable to close the apertures in said grill.

2. In an air heating appliance, an elongated, substantially rectangular casing, said casing including a back and sides, a plan grill member for the front of the casing, partition members in said casing, said partition members being planar and imperforate and converging towards the center of the casing, said partition members having their rear end edges spaced apart to form a slot, said partition members and said grill forming a chamber, a heating element disposed in said chamber in advance of said slot and in the rear of said grill, a fan in the lower portion of said casing and adapted to draw air into the casing, means to direct a column of air from the fan through the partition members so that it impinges on the heating element, damper means movable to close the apertures in said grill, a second chamber above said partitions and communicating with the space in front of the partitions, said second chamber having an outlet therefrom and damper means controlling the passage of air through said outlet.

3. In an air heating appliance, an elongated casing rectangular in cross section, said casing including a back and sides, a plane grill member for the front of the casing, partition members in said casing, said partition members being planar and imperforate and converging towards the center of the casing, said partition members having flanged front edge portions secured to the front of the sides and having their rear end edges spaced apart to form a slot, said partition members and said grill forming a chamber, a heating element disposed in said chamber in advance of said slot and in the rear of said grill, insulating members on said heating element, said insulating members being slotted to receive the inner edges of the partition members, a fan in the lower portion of said casing and adapted to draw air into the casing, means to direct a column of air from the fan through the slot between the partition members so that it impinges on the heating element, pivoted damper members movable to close the apertures in said grill, a second chamber above said partitions and communicating with the first chamber, said second chamber having an outlet therefrom and louvered damper means controlling the passage of air through said outlet.

HOWARD H. CARPENTER.